(12) United States Patent
Shinozaki et al.

(10) Patent No.: US 12,290,827 B2
(45) Date of Patent: May 6, 2025

(54) METHOD FOR SECURING A PART DURING FABRICATION

(71) Applicant: The Boeing Company, Chicago, IL (US)

(72) Inventors: John Shinozaki, Kenmore, WA (US); Jerry Deming Chungbin, Kenmore, WA (US); Steven Kuan-chi Wu, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1099 days.

(21) Appl. No.: 16/983,490

(22) Filed: Aug. 3, 2020

(65) Prior Publication Data

US 2020/0360951 A1    Nov. 19, 2020

Related U.S. Application Data

(63) Continuation of application No. 16/138,019, filed on Sep. 21, 2018, now Pat. No. 10,773,272.

(51) Int. Cl.
*B05B 13/02* (2006.01)
*B05B 16/00* (2018.01)
*B23P 25/00* (2006.01)

(52) U.S. Cl.
CPC .......... *B05B 13/0214* (2013.01); *B05B 16/90* (2018.02); *B23P 25/00* (2013.01); *Y10T 29/49995* (2015.01); *Y10T 29/49998* (2015.01)

(58) Field of Classification Search
CPC .................... Y10T 29/49888; Y10T 29/49998
See application file for complete search history.

(56) References Cited

U.S. PATENT DOCUMENTS

| | | | | |
|---|---|---|---|---|
| 4,743,462 A | * | 5/1988 | Radzavich | C23C 4/18 427/300 |
| 5,164,011 A | * | 11/1992 | Ray | B05B 13/0285 118/503 |
| 9,415,411 B2 | * | 8/2016 | Deck | B05B 12/26 |
| 11,014,172 B2 | * | 5/2021 | Okada | B23B 45/008 |
| 2013/0236324 A1 | * | 9/2013 | Bech | F03D 80/70 294/81.1 |
| 2016/0368083 A1 | * | 12/2016 | Lowell | B23K 26/0624 |

* cited by examiner

*Primary Examiner* — Sarang Afzali
(74) *Attorney, Agent, or Firm* — Joseph M. Butscher; The Small Patent Law Group LLC

(57) ABSTRACT

Systems and methods are provided for securement of parts. One embodiment is a method for securing a part during fabrication. The method includes forming an interference fit between a pin and a wall defining a hole, supporting a weight of the part with the interference fit, and rotating the part around an axis of the part while the weight of the part is supported.

20 Claims, 17 Drawing Sheets

METHOD FOR SECURING A PART DURING FABRICATION

FIELD

The disclosure relates to the field of fabrication, and in particular, to tools for holding large parts in place.

BACKGROUND

Large parts, such as components of an airframe of an aircraft, may weigh hundreds of pounds or more and may extend for tens or hundreds of feet. In order to perform work efficiently on such parts, the parts may be secured in place via one or more fixtures. However, fixtures for a large part necessarily mask off affixed portions of the part from view. This means that when a large part undergoes a surface treatment (e.g., painting), the masked portions of the part do not receive the surface treatment. To address this problem, current techniques for surface treatment require a part to be secured to a fixture, treated, dried, moved to another fixture that couples with different locations on the part, and then touched up. This is a highly labor-intensive process that consumes a great deal of time.

Therefore, it would be desirable to have a method and apparatus that take into account at least some of the issues discussed above, as well as other possible issues.

SUMMARY

Embodiments described herein provide for fixtures that secure a part without masking the surface of the part, by inserting pins of an adjustable diameter into holes within the part. Because the fixtures secure parts without masking the surfaces of those parts, the parts may receive surface treatments without the need for touch-up or re-mounting. In further embodiments, the fixtures facilitate rotation of a part about its center of mass, enabling technicians to freely reorient the part as needed when applying a surface treatment. One embodiment is a method for securing a part during fabrication. The method includes forming an interference fit between a pin and a wall defining a hole, supporting a weight of the part with the interference fit, and rotating the part around an axis of the part while the weight of the part is supported.

A further embodiment is a non-transitory computer readable medium embodying programmed instructions which, when executed by a processor, are operable for performing a method for fixing a part in place. The method includes aligning a pin with a hole in the part, inserting the pin into the hole, increasing a diameter of the pin to form an interference fit with a wall defining the hole, supporting a weight of the part with the interference fit, and rotating the part around a cross-sectional center of mass of the part while the weight of the part is supported.

Another embodiment is a method of adapting a fixture for mounting a part to a track. The method includes applying an adapter to an end of a barrel pin that extends through a hole in a part and is in an interference fit with side walls of the hole, placing the adapter onto a track, and moving the part along the track by sliding the adapter within the track.

Yet another embodiment is a method of applying a surface treatment to a part. The method includes connecting side walls of a hole in a part to a fixture, and applying a surface treatment to a surface of the part while an interference fit connects the inner walls of the hole to the fixture.

A still further embodiment is an apparatus for supporting a part during fabrication. The apparatus includes a fixture comprising a body, an engagement surface disposed along a length of the body, a slider that engages with the groove and is configured to slide within the groove, a yoke having a first end affixed to the slider and having a securable second end, and at least one pin that protrudes away from the body towards the part, the pin forms an interference fit with a hole in the part.

An additional embodiment is a method for securing a part during fabrication. The method includes forming a connection between a pin at a fixture and a hole at a part, supporting a weight of the part with the connection, and rotating the part around an axis of the part while the weight of the part is supported.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
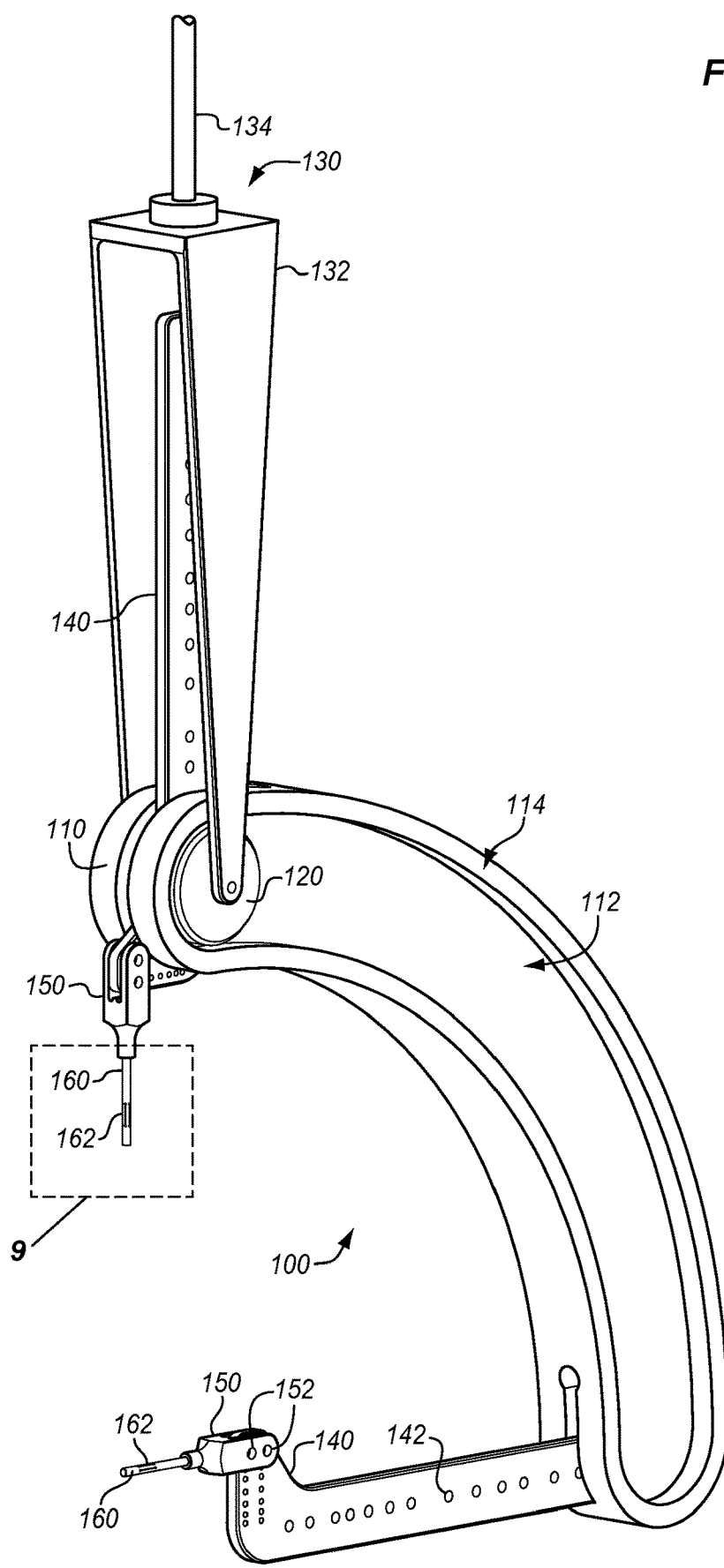
FIG. 1 illustrates a fixture in an illustrative embodiment.

FIG. 1 illustrates a fixture 100 in an illustrative embodiment. Fixture 100 comprises any system, device, or component operable to securely hold a large part in place by forming an interference fit with holes in the part. The part may comprise a front spar, center spar, rear spar, or any component for which a full surface treatment is desired. In this embodiment, fixture 100 comprises body 110, which includes an engagement surface (e.g., groove 112) disposed along a length of body 110 and flange 114 which follows the groove 112. Both body 110 and groove 112 have an arcuate shape. Slider 120 is mounted within groove 112, slides within groove 112, and is supported by protrusions 132 of yoke 130. Yoke 130 is itself supported by a fixed body (e.g., the ceiling, a ground-based scaffold, etc.) via cable 134, and holds fixture 100 in place. In one embodiment, a slider 120 is disposed within a groove 112 on each side of fixture 100 and rolls/slides along flange 114.

Figure 9:
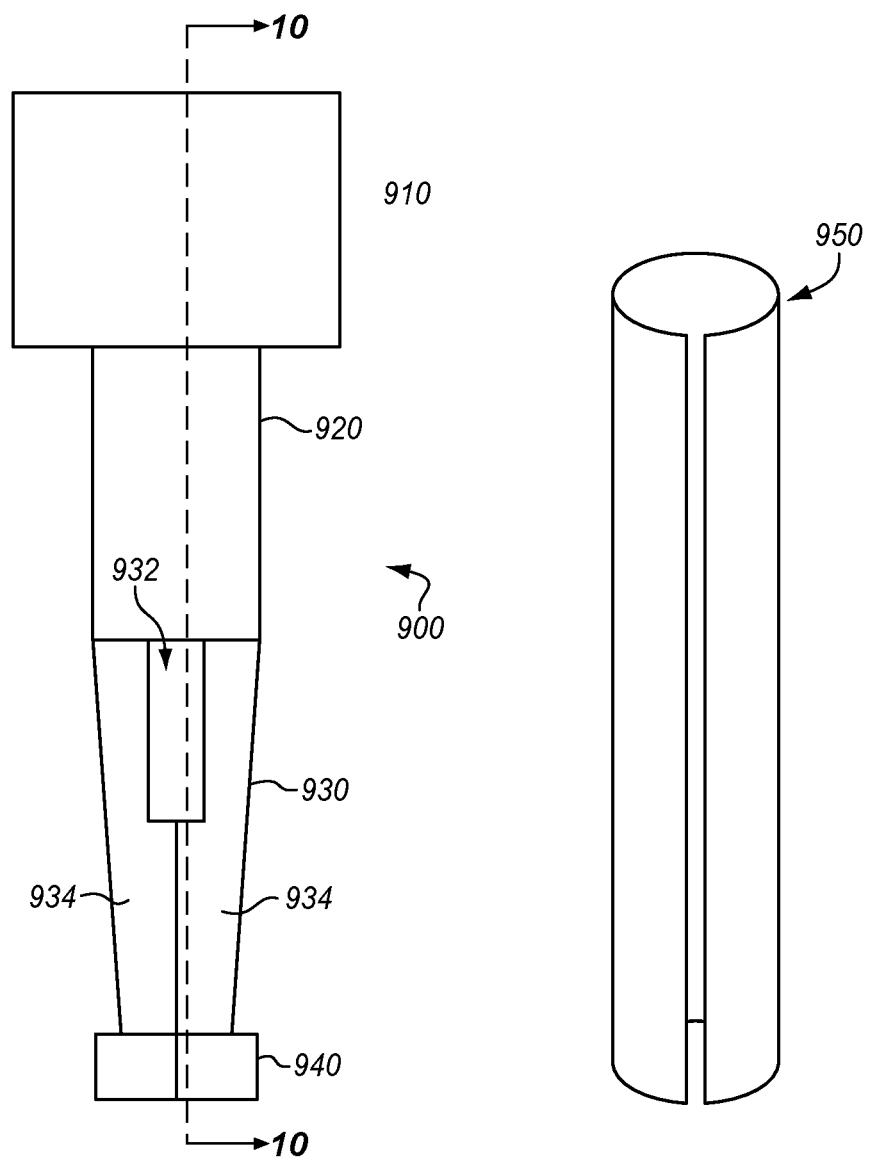
FIG. 9 illustrates a barrel pin utilized by a fixture in an illustrative embodiment.
Figure 10:
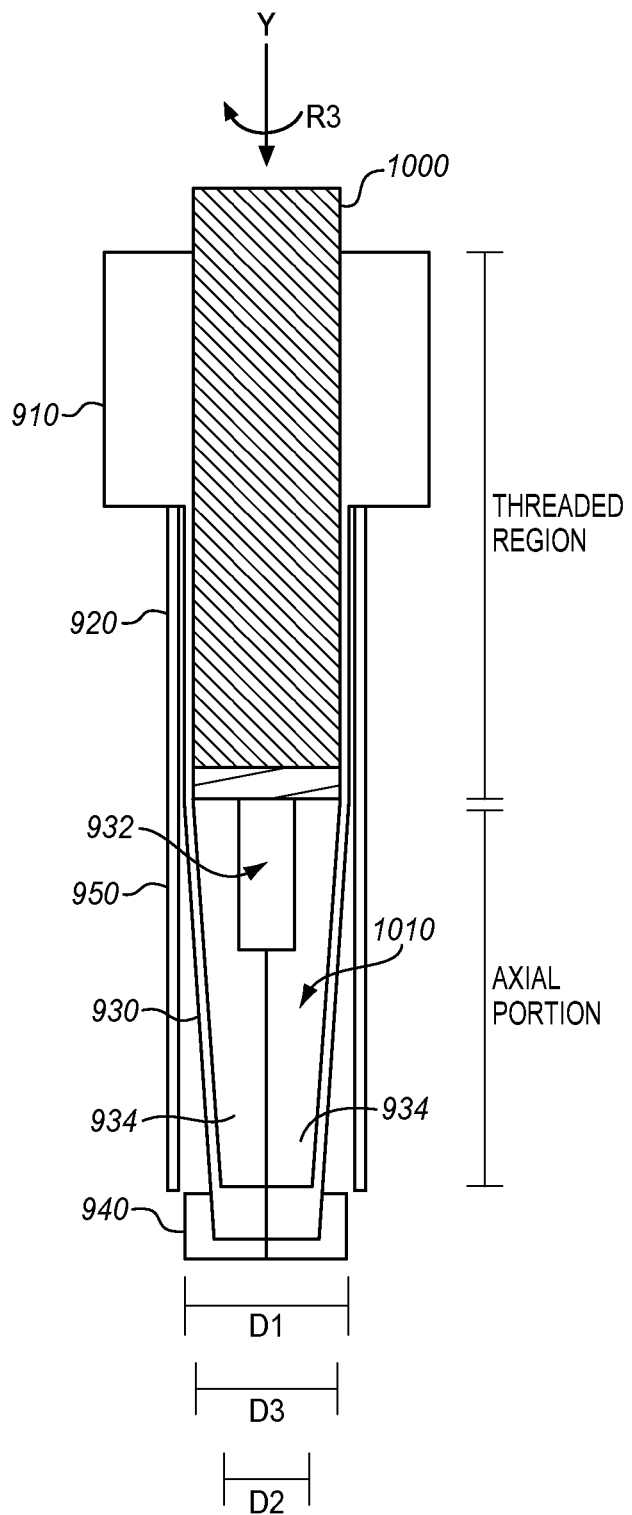
FIGS. 10-11 are cut-through views illustrating motion of an internal rod through a barrel pin to cause an interference fit in an illustrative embodiment.
Figure 11:
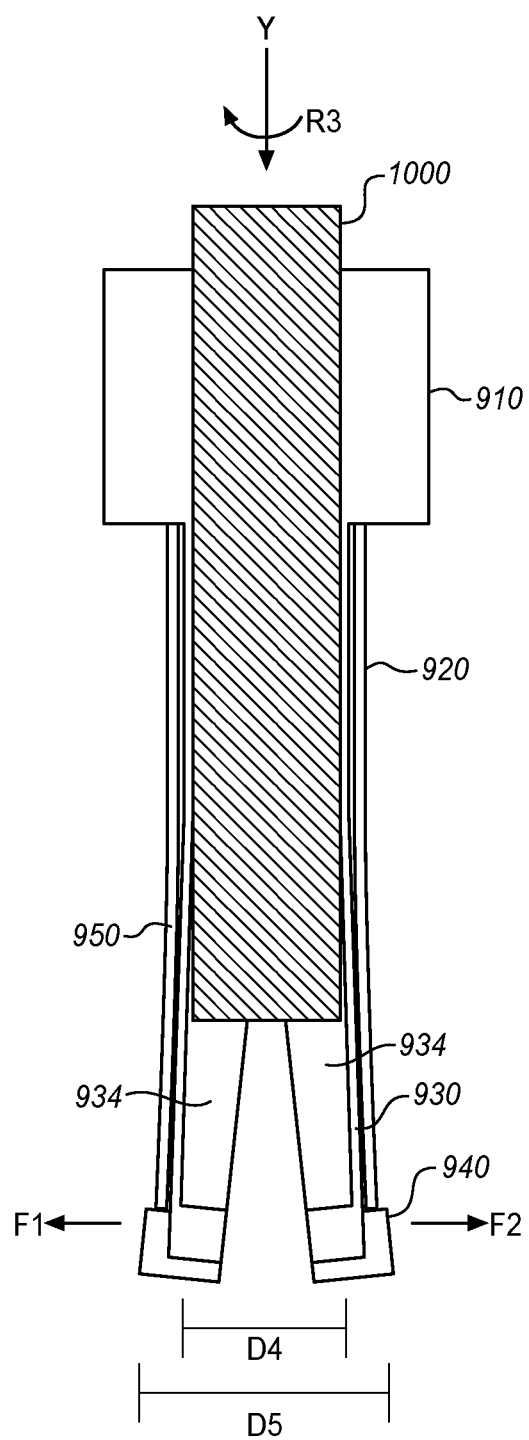

Arms 140 (e.g., cantilevered arms) extend from body 110 of fixture 100, and may be adjustably positioned with respect to body 110 using mounting holes 142. By adjusting the mounting holes that are used to fixedly attach an arm 140 to body 110, fixture 100 may be calibrated to support a variety of part sizes and/or shapes. Pins 160 are affixed to arms 140 via pin mount 150. Pins 160 protrude away from body 110 towards a part, and include a portion 162 (e.g., a portion of an axial length of a pin 160) that increases in diameter to form an interference fit with a hole in the part (e.g., as illustrated in FIGS. 9-11). In this embodiment, pin mount 150 is secured at two points 152, which in combination prevent undesired pivoting. Meanwhile, arm 140 is fixed at the end which contacts body 110, in order to prevent pivoting.

Fixture 100 provides a technical benefit over prior fixation systems because it utilizes pins 160 which have an adjustable diameter. This enables the pins to be inserted into holes at a part, and then expanded in size to form an interference fit with sidewalls of the hole. The holes may comprise through-holes or blind holes. The holes may also be positioned such that they extend toward a cross-sectional center of gravity of the part being held. In this manner, the holes are oriented such that when a pin 160 is inserted, the pin may support the part without applying a torque to the part. In further embodiments, holes may be disposed in locations where a neutral axis of the part will be the center of a cylinder formed by a radius of groove 112, such that the part will hang without twisting or moving. The holes may even comprise undersized holes, and may be drilled out to an assembly diameter after pins 160 at fixture 100 have been removed. When an interference fit is formed between fixture 100 and a part, the entire surface of the part remains visible and capable of receiving a surface treatment. Thus, the entire part may be surface treated without having to be re-mounted. Fixture 100 provides another technical benefit by allowing an affixed part to be easily rotated by sliding slider 120. This may be accomplished without having to release the part from fixture 100.

Figure 2:
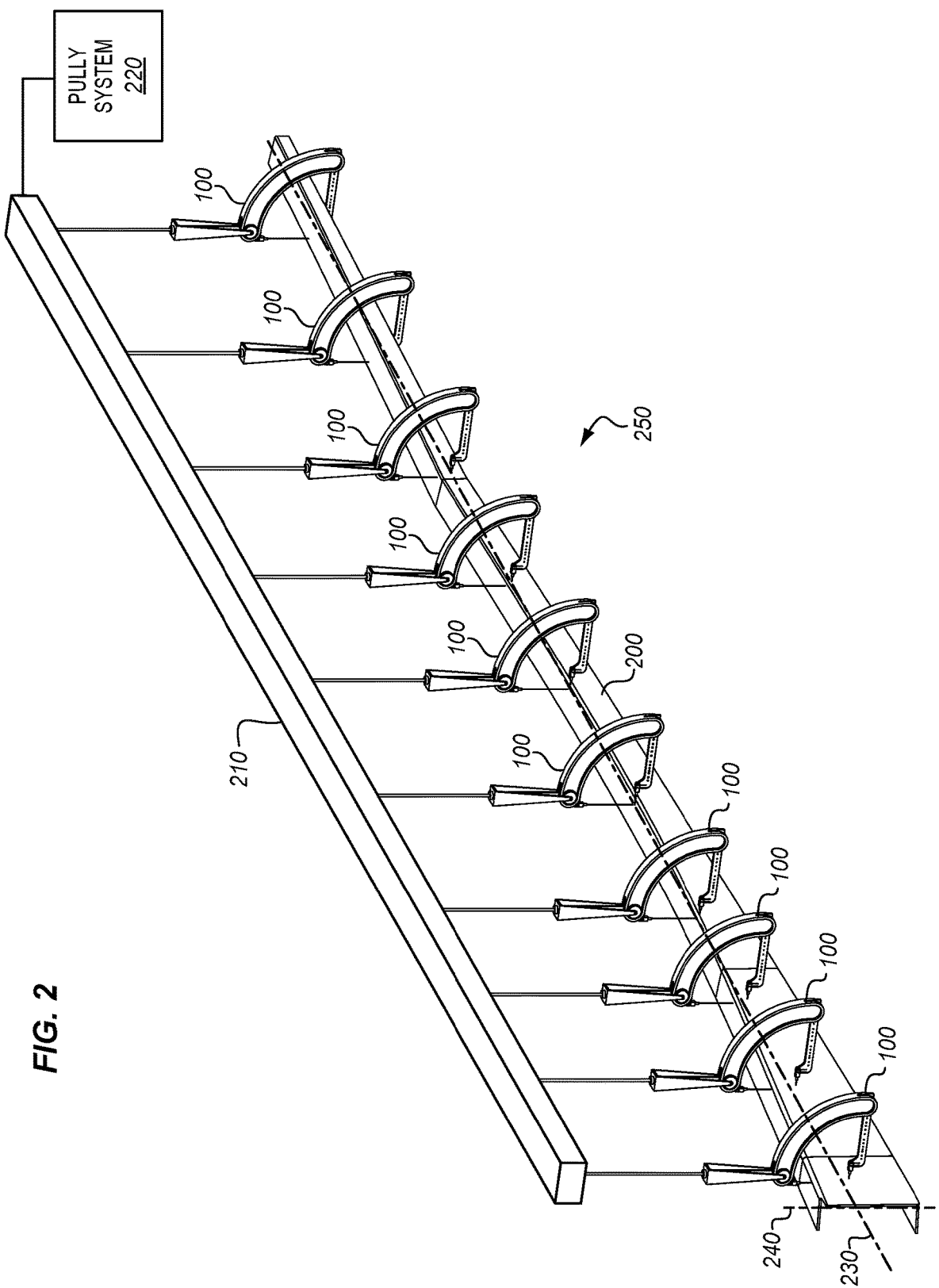
FIG. 2 illustrates a fixation system comprising multiple fixtures in an illustrative embodiment.

FIG. 2 is a diagram of a fixation system 250 comprising multiple fixtures 100 in an illustrative embodiment. According to FIG. 2, fixation system 250 holds a part 200 in place via multiple fixtures 100 which hang from a fixed body 210 (e.g., a beam, a ceiling, etc.). A height of the part 200 may be controlled via pulley system 220, which adjusts cabling for fixtures 100 in order to pull fixtures 100 up or down. In some embodiments, pulley system 220 may even be adjusted to place different one of fixtures 100 in different vertical locations. Part 200 includes a neutral axis 230. Centerlines 240 of holes in part 200 (and therefore the axes of pins 160) intersect with neutral axis 230. This means that after part 200 is rotated about its neutral axis 230 while attached to fixtures 100, part 200 remains substantially at rest and does not experience substantial (e.g., any) resting torque to rotate back to its original position. While neutral axis 230 is illustrated as forming a straight line, in further embodiments the neutral axis 230 may be curved or follow any suitable path. Pulley system 220 may also be adjusted to compensate for differences in elevation between fixtures 100 when securing a part having a curving or changing neutral axis. Pulley system 220 may also be adjusted to compensate for differences in elevation between fixtures 100 when securing a part having a curving or changing neutral axis.

While fixation system 250 is shown as including multiple fixtures 100 of the same design and size, in further embodiments the fixation system 250 may use fixtures 100 of different shapes and/or sizes in order to accommodate changes in the geometry of the part along the length of the part.

Illustrative details of the operation of fixation system 250 will be discussed with regard to FIG. 3. Assume, for this embodiment, that part 200 is about to be mounted to a fixture 100 of fixation system 250.

Figure 3:
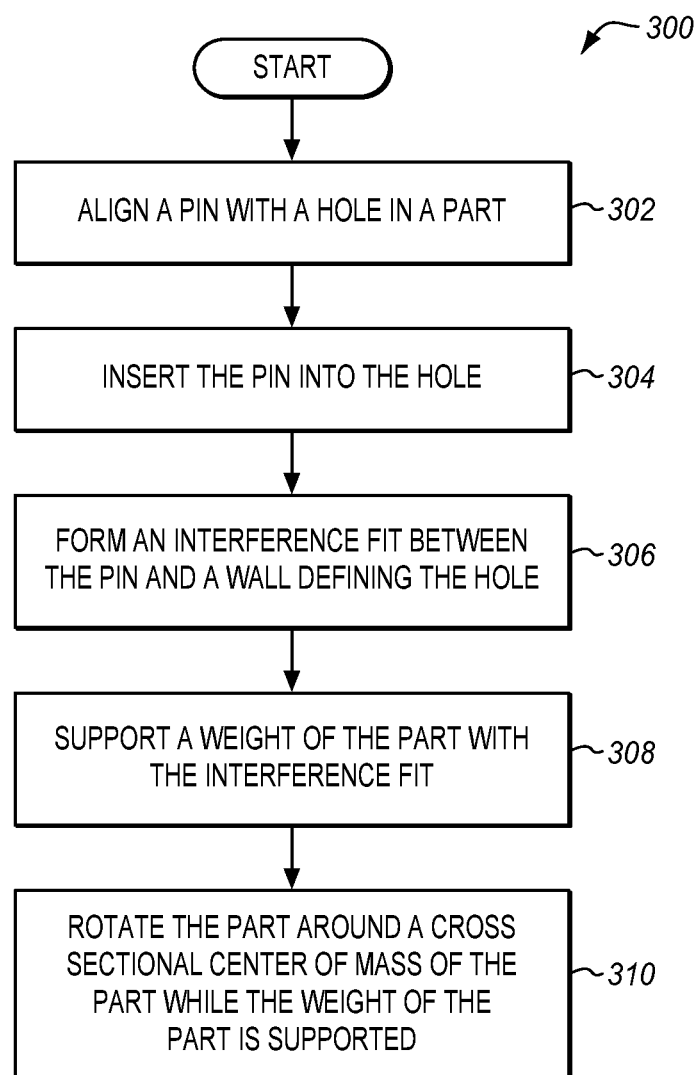
FIG. 3 is a flowchart illustrating a method for applying a fixture to a part in an illustrative embodiment.

FIG. 3 is a flowchart illustrating a method 300 for applying a fixture to a part in an illustrative embodiment. The steps of method 300 are described with reference to fixture 100 of FIG. 1, but those skilled in the art will appreciate that method 300 may be performed with other systems or devices. The steps of the flowcharts described herein are not all inclusive and may include other steps not shown. The steps described herein may also be performed in an alternative order.

Figure 4:
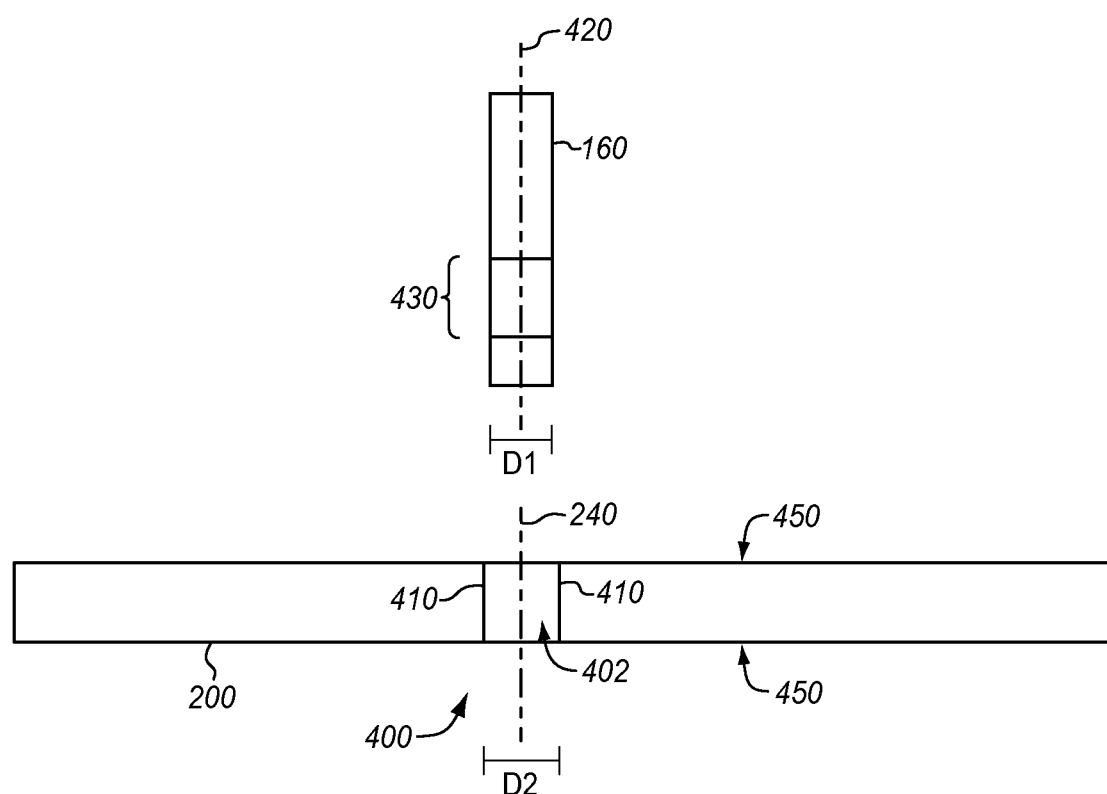
FIGS. 4-6 illustrate affixation of a pin to a part in an illustrative embodiment.

In step 302, a pin 160 is aligned with a hole in part 200. For example, as shown in FIG. 4, axis 420 of pin 160 may be made collinear with centerline 240 of hole 400. After being aligned, pin 160 may slip between sidewalls 410 and into interior 402 of hole 400, because a portion 430 of pin 160 has a diameter (D1) that is less than a diameter (D2) of hole 400. Surfaces 450 of part 200 are also depicted in FIG. 4.

Figure 5:
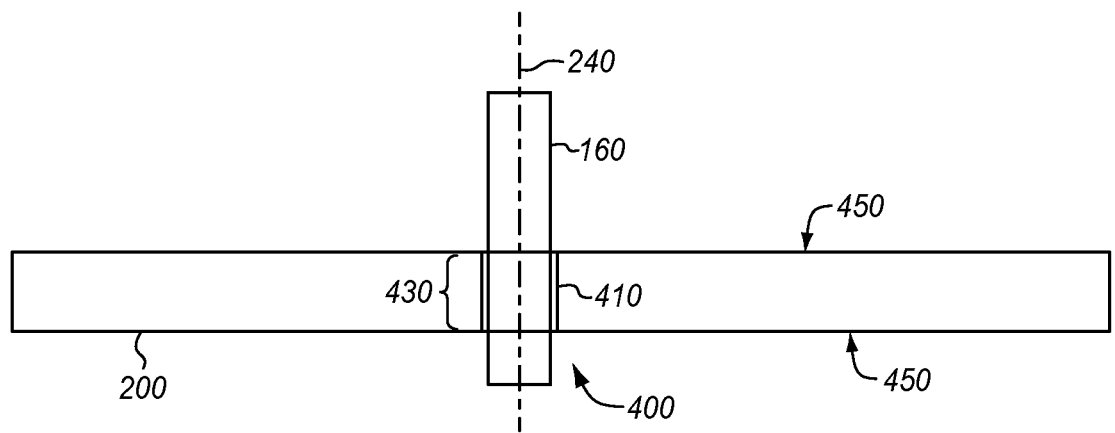
Figure 6:
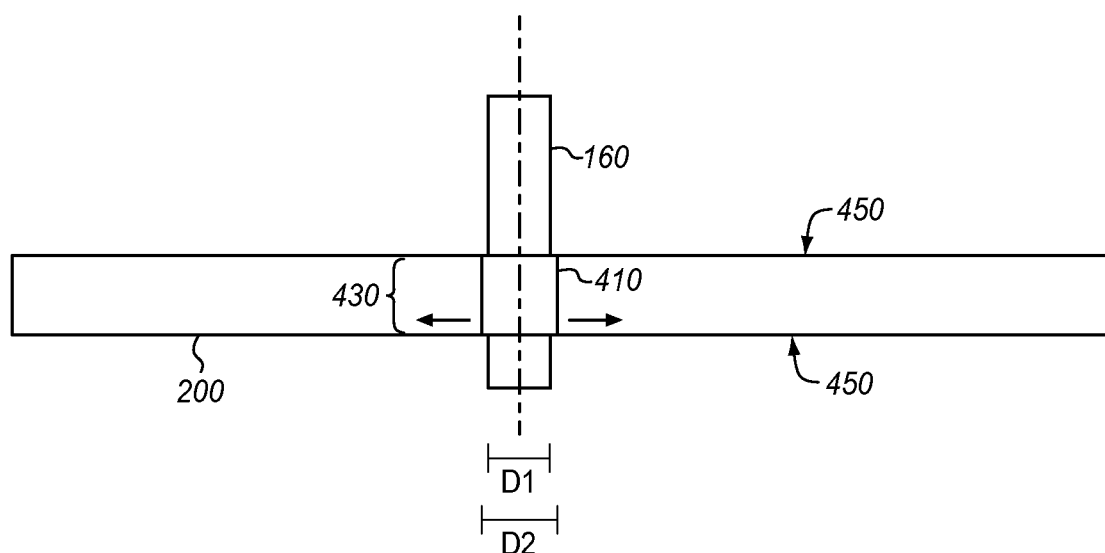

In step 304, at least one of pins 160 (e.g., one of pins 160, both pins 160, etc.) is inserted into the hole 400. For example, the portion 430 of pin 160 may be inserted within interior 402 of the hole 400 (as depicted in FIG. 5). In step 306, a diameter of the pin 160 (e.g., portion 430) is increased to form an interference fit between pin 160 and a wall (i.e., sidewall 410) defining the hole 400 (as depicted in FIG. 6). This may comprise increasing the diameter of the portion 430 until the diameter of the portion 430 meets or exceeds D2. This prevents the part 200 from separating from pin 160, forming a secure fit. The interference fit also does not mask off surfaces 450. Surfaces 450 therefore remain exposed to receive a surface treatment.

In further embodiments, hole 400 may include a lip or flange (not shown) that protrudes slightly out of the hole and partially covers a portion of surface 450. In such an embodiment, the portions that are covered by the lip or flange may be drilled out when the hole 400 is drilled to a final diameter for fabrication. This act of drilling out to the final diameter removes any masked areas. Such lips or flanges may help to provide additional support to that provided by the interference fit with pin 160, or may replace an interference fit with a clamping fit.

In step 308, a weight of the part 200 is supported with the interference fit. The part may then undergo a surface treatment while surfaces 450 remain entirely exposed and the interference fit remains. In step 310, part 200 is rotated about its neutral axis 230 while the weight of the part 200 is supported. This may be performed by sliding body 110 and groove 112 around slider 120 as slider 120 remains supported by yoke 130. Furthermore, this process ensures that part 200 remains at rest after it has been rotated, and does not experience any resting torque in its new position. This may facilitate easier access to surfaces 450 during the surface treatment.

Method 300 provides a technical benefit by affixing large parts in manner that does not mask off the surfaces of those parts. Method 300 provides a further technical benefit by enabling large parts to be easily rotated while they are secured to fixtures. This reduces the amount of labor involved in handling the part.

Figure 7:
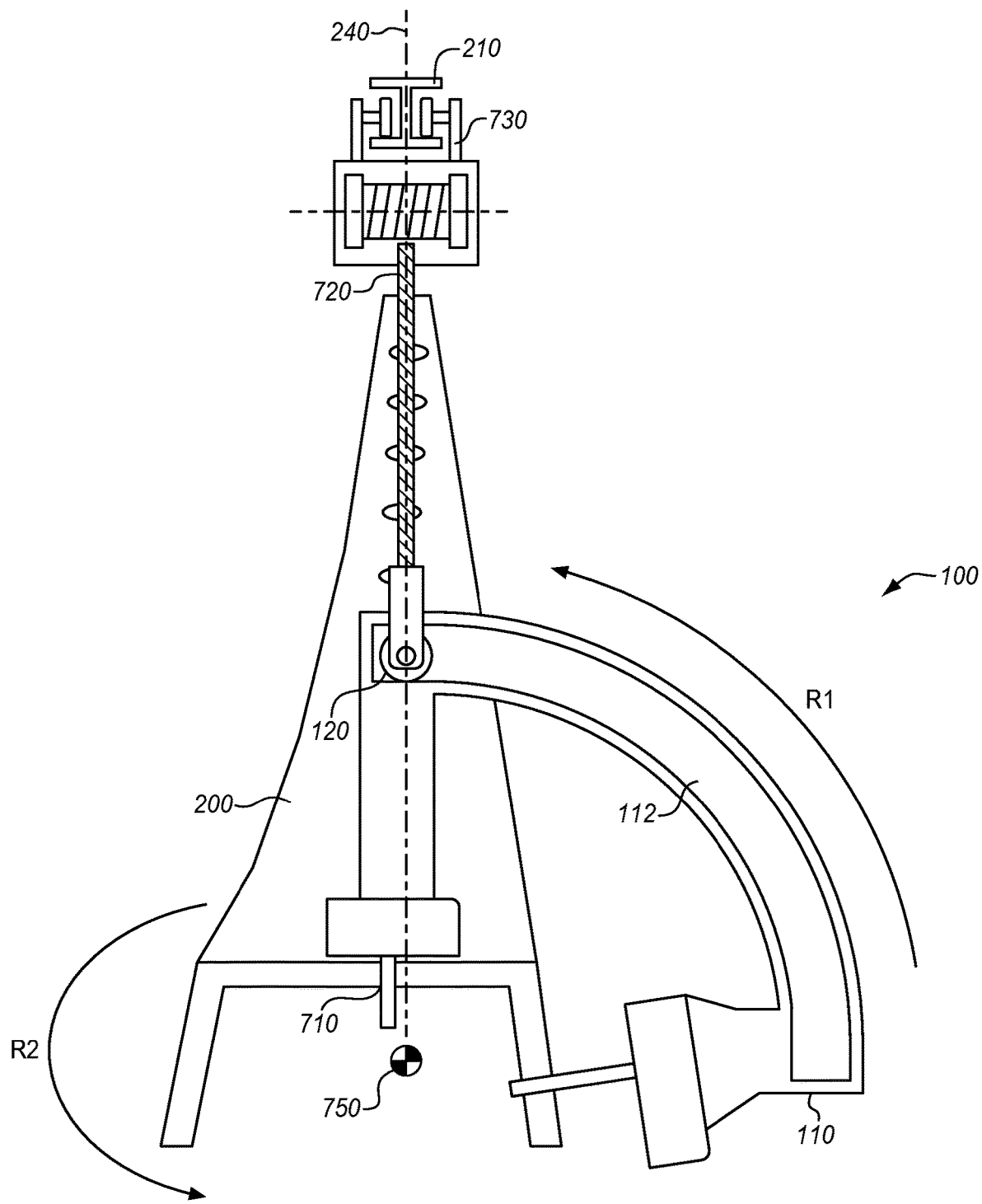
FIGS. 7-8 illustrate rotation of a part and fixture about a cross-sectional center of mass of the part in an illustrative embodiment.
Figure 8:
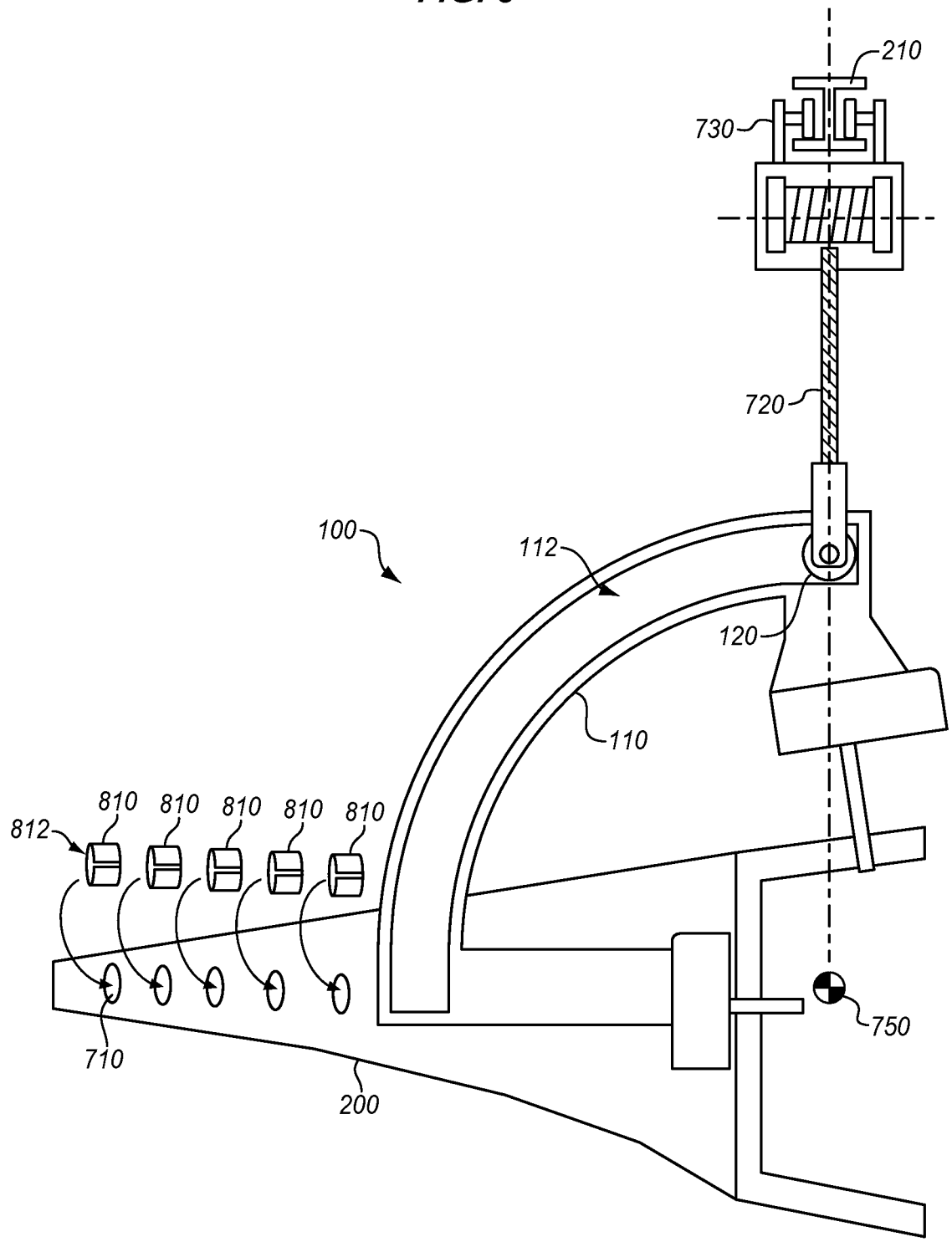

FIGS. 7-8 illustrate rotation of a part 200 and fixture 100 about a cross-sectional center of mass 750 of the part in an illustrative embodiment. As shown in FIG. 7, part 200 is secured to fixture 100, which hangs from cable 720. Cable 720 is attached to cart 730, which slides along fixed body 210 (e.g., a beam) into and out of the page. Part 200 is also illustrated as including one or more holes 710. Part 200 is rotated in direction R2 about its cross-sectional center of mass 750. Groove 112 of fixture 100 slides along slider 120 in direction R1. In effect, rotation of part 200 may be accomplished directly by rotating a fixture 100. In FIG. 8, part 200 has been rotated to a new axial orientation. In this new orientation, different surfaces of part 200 may be more easily surface treated than before.

FIG. 8 also illustrates metal inserts 810 that may be inserted into holes 710 within part 200. Metal inserts 810 may provide additional strength, particularly in embodiments where part 200 comprises a composite part. Metal inserts 810 may for example be driven into a composite part and may define the boundaries of a hole in the composite part. In this particular embodiment, each metal insert 810 includes a lip 812 that masks a small portion of the part. This masking may be drilled out when hole 710 is drilled out from a tooling diameter to a final diameter for fabrication.

FIG. 9-11 illustrate further details of the pins discussed above in an illustrative embodiment. Specifically, FIGS. 9-11 correspond with region 9 of FIG. 1. FIG. 9 illustrates a barrel pin 900 utilized by a fixture in an illustrative embodiment. According to FIG. 9, barrel pin 900 includes body 910, cylinder 920, and portion 930. Portion 930 is configured to increase in diameter. An aperture 932 is included within portion 930, and facilitates flexion of flanges 934. In this embodiment, barrel pin 900 may be covered by a sacrificial jacket 950. Sacrificial jacket 950 may form an outer surface of portion 930, and may comprise a high friction material or inexpensive sacrificial material (e.g., a plastic) that facilitates formation of an interference fit. Sacrificial jacket 950 may increase friction and gripping of a hole by barrel pin 900 as well as protecting the portion of the pin under the sacrificial jacket 950. Sacrificial jacket 950 also receives a surface treatment (e.g., paint) instead of barrel pin 900, ensuring that barrel pin 900 may be used again without degrading. In this embodiment, barrel pin 900 includes a lip 940 which may or may not mask a small portion of a surface of a part, depending on the manner in which barrel pin 900 is inserted, the depth to which barrel pin 900 is inserted, and whether or not a hole in the part is a through-hole or a blind hole. In embodiments where lip 940 provides masking, a diameter of the hole may be drilled out to eliminate the masking.

FIGS. 10-11 are cut-through views illustrating motion of an internal rod through a barrel pin to cause an interference fit in an illustrative embodiment. In these illustrations, sacrificial jacket 950 has been installed onto the barrel pin 900. Specifically, FIGS. 10-11 correspond with view arrows 10 of FIG. 9. In FIG. 10, internal rod 1000 is driven in direction Y (e.g., via a threaded screw drive) when it is turned in direction R3. This drives internal rod 1000 into an internal recess 1010 defined by flanges 934. At this point, internal recess 1010 has a diameter of D2, which results in the barrel pin 900 having a diameter D1.

In FIG. 11, internal rod 1000, which has a diameter D3 greater than the diameter D2 of internal recess 1010, if further driven into internal recess 1010. This generates forces F1 and F2 which cause the flanges 934 to elastically deflect outward, increasing a diameter of the internal recess to D4, resulting in a diameter of the portion 930 and/or lip 940 increasing to D5 which corresponds to a diameter of a hole. This may cause a sacrificial jacket 950 placed over barrel pin 900 to contact a wall defining hole 400. If the sacrificial jacket 950 is damaged or deformed by holding the interference fit, it may be replaced before barrel pin 900 is used to secure another part 200.

Figure 12:
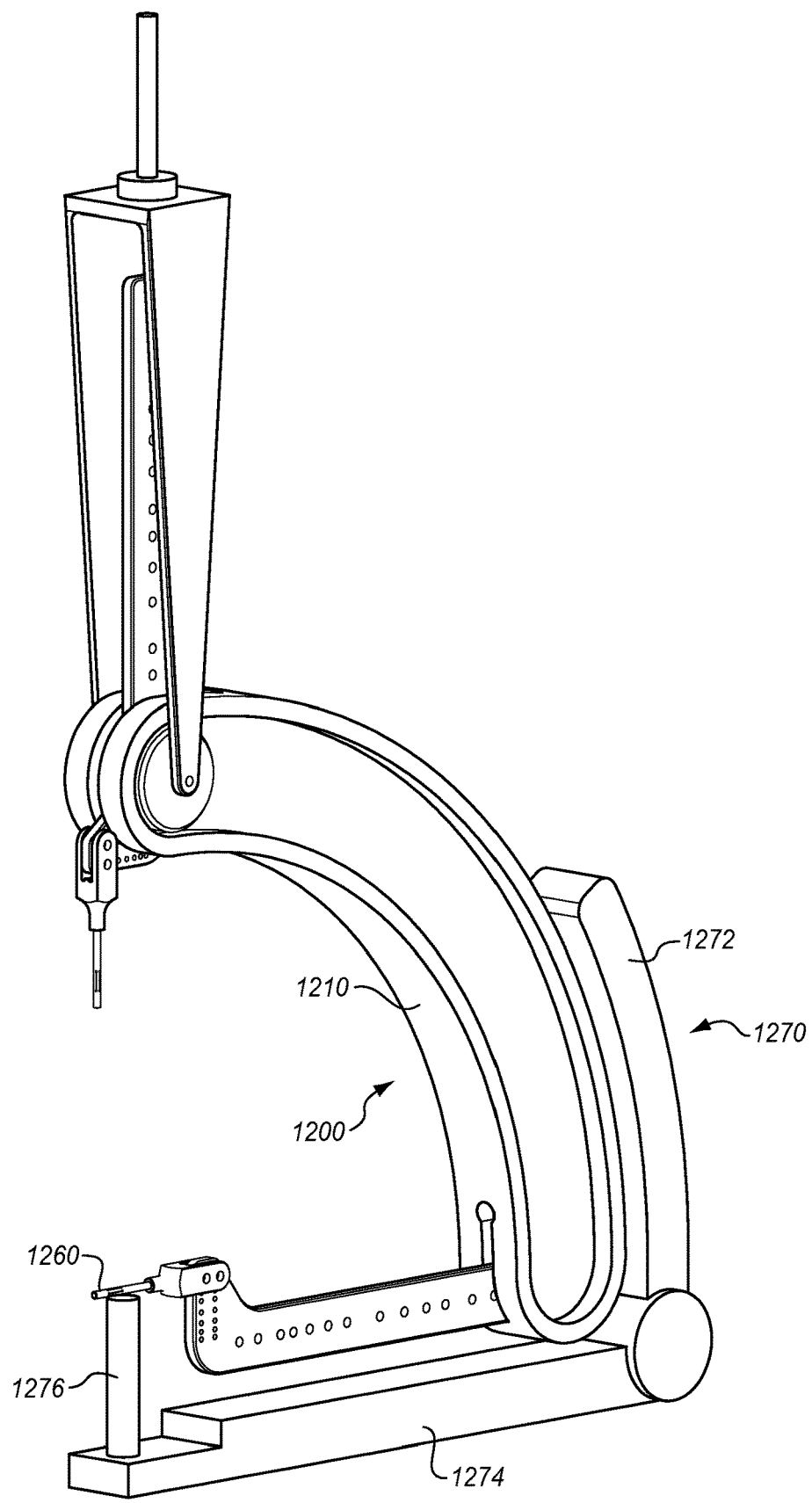
FIG. 12 illustrates a fixture that includes a support in an illustrative embodiment.

FIG. 12 illustrates a fixture 1200 that includes a support 1270 in an illustrative embodiment. Support 1270 is directly attached to a pin 1260 in order to reinforce pin 1260. Backing 1272 of support 1270 is secured to body 1210. Meanwhile, spar 1274 and head 1276 of support 1270 provide additional strength to support pin 1260 when pin 1260 is placed into shear or experiences bending moments. This provides a technical benefit by reducing the chances of pin 1260 encountering plastic deformation or cracking.

Figure 13:
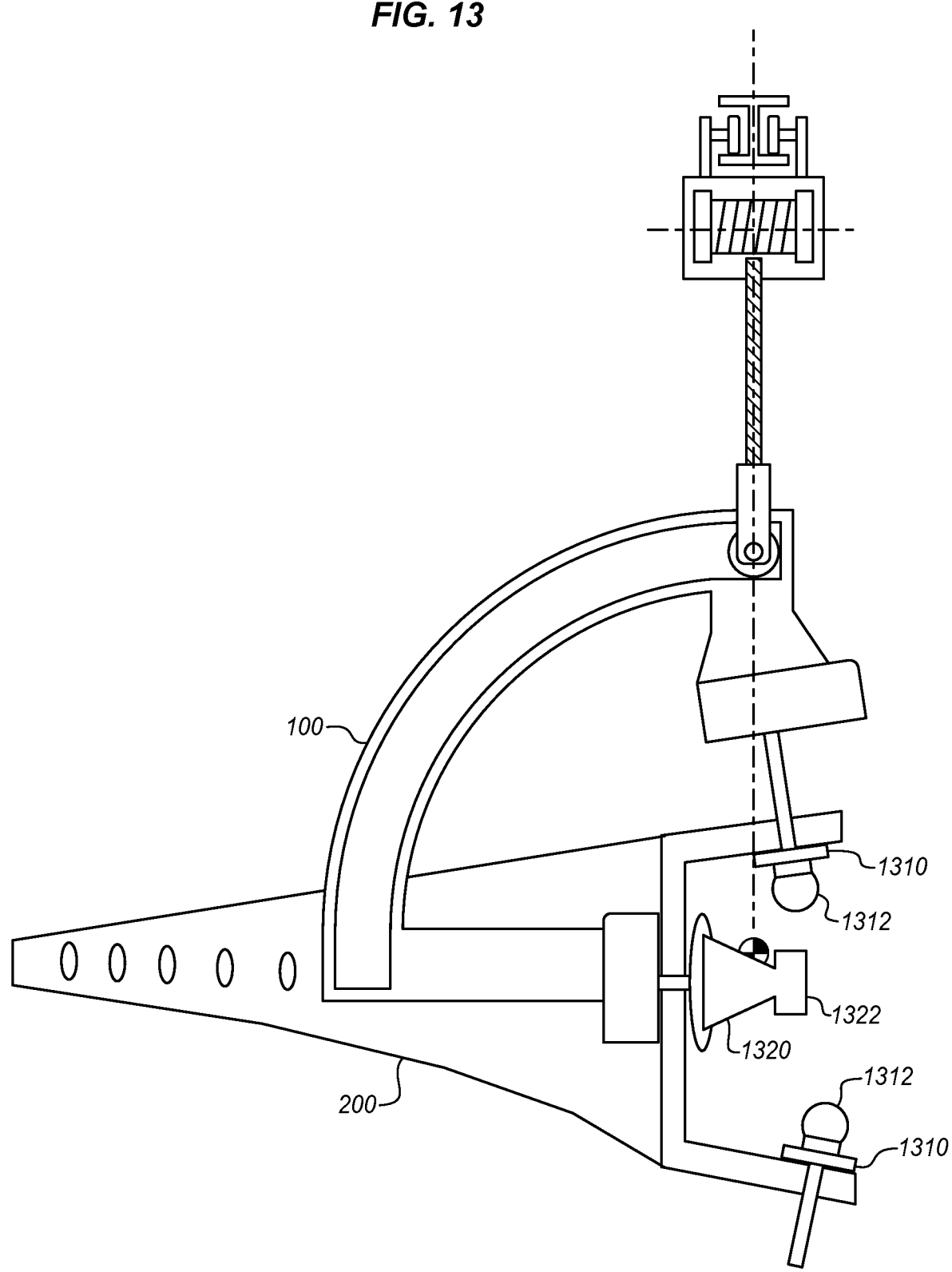
FIGS. 13-14 illustrate application of adapters to pins at fixtures in order to facilitate moving a part via a track in an illustrative embodiment.
Figure 14:
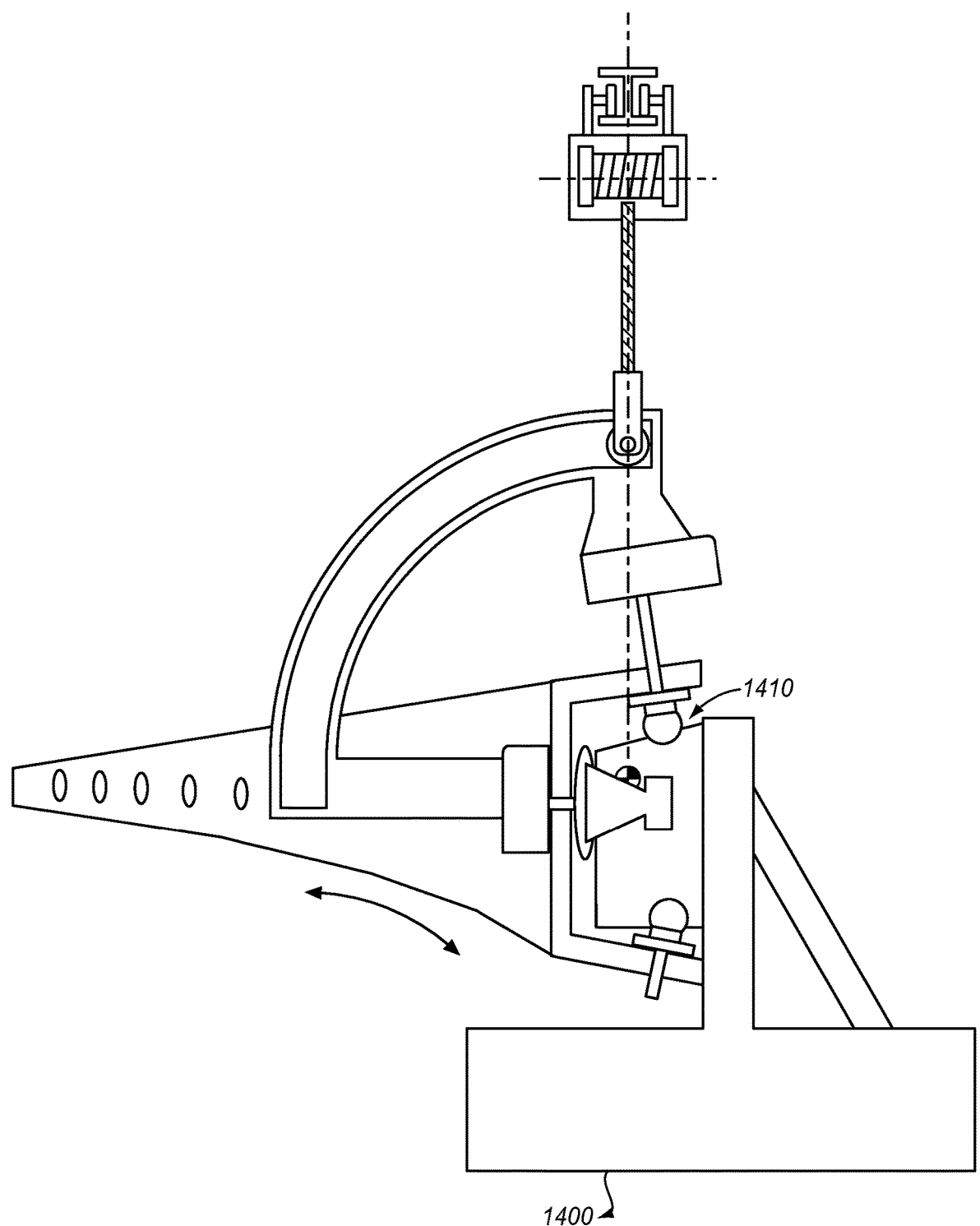

FIGS. 13-14 illustrate application of adapters to pins at fixtures in order to facilitate moving a part via a track in an illustrative embodiment. In this embodiment, adapters 1310 and adapters 1320 are clamped, threaded, or otherwise affixed to pins of a fixture 100, after the pins have been secured to a part. Adapters 1310 include features 1312 (e.g., grooves, wheels, balls) that facilitate sliding within a track, and adapters 1320 include features 1322 which facilitate sliding within a track. In this manner, part 200 may be slid within a track assembly without needing to be removed from fixtures 100. For example, as shown in FIG. 14, part 200 may be moved in directions 1400 within track assembly 1410, by using features 1312 and features 1322 as bearing surfaces. In further embodiments, painting or other surface treatments may be performed between step 308 and step 310 of method 300 above, and the part may then be mounted to a track as illustrated in FIG. 13 and FIG. 14. One or more of fixtures 100 may be removed, or left on, during this process. In further embodiments, sacrificial jackets may be removed and/or replaced after painting.

In further embodiments, a part may be transferred from one set of fixtures to another set of fixtures. In this embodiment, the weight of the part is supported via multiple pins that have been inserted into multiple holes at the part, and the method for transfer includes releasing a subset of the pins of a first fixture from a subset of the holes at the part, inserting a new set of pins of a second fixture into the subset of the holes at the part, and releasing remaining pins of the first fixture. This method supports the part and enables access to an entire surface of the part without any resultant masking.

Figure 16:
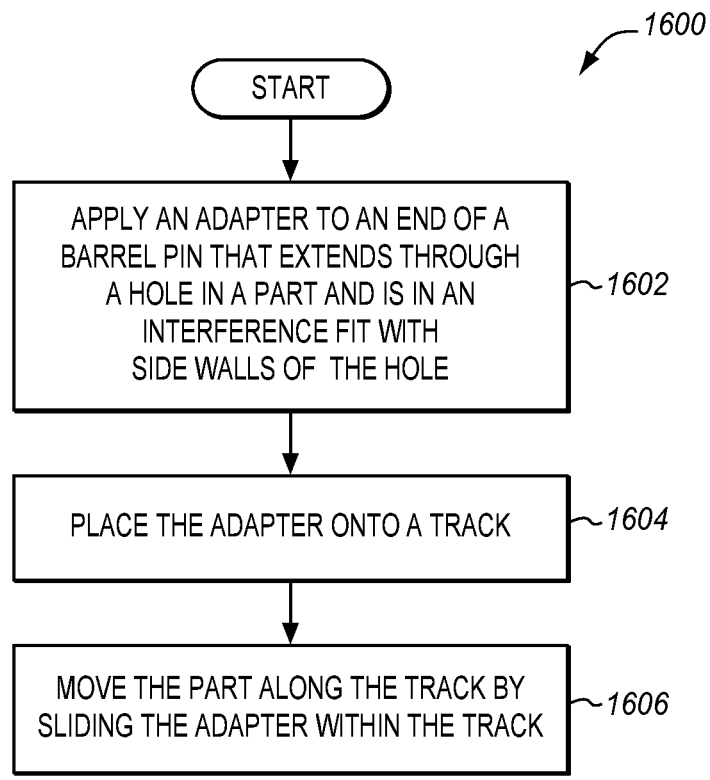
FIG. 16 is a flowchart illustrating a method of adapting a fixture for mounting a part to a track.

FIG. 16 is a flowchart illustrating a method of adapting a fixture for mounting a part to a track. The method includes applying an adapter to an end of a barrel pin that extends through a hole in a part and is in an interference fit with side walls of the hole (step 1602), placing the adapter onto a track (step 1604), and moving the part along the track by sliding the adapter within the track (step 1606).

Figure 17:
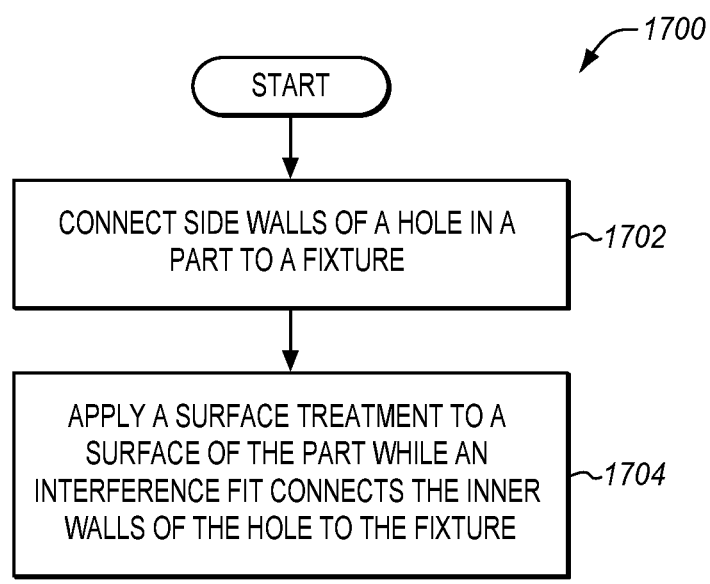
FIG. 17 is a flowchart illustrating a method of applying a surface treatment to a part.

FIG. 17 is a flowchart illustrating a method of applying a surface treatment to a part. The method includes connecting side walls of a hole in a part to a fixture (step 1702), and applying a surface treatment to a surface of the part while an interference fit connects the inner walls of the hole to the fixture (step 1704).

EXAMPLES

In the following examples, additional processes, systems, and methods are described in the context of a fixation system for a large part.

Figure 15:
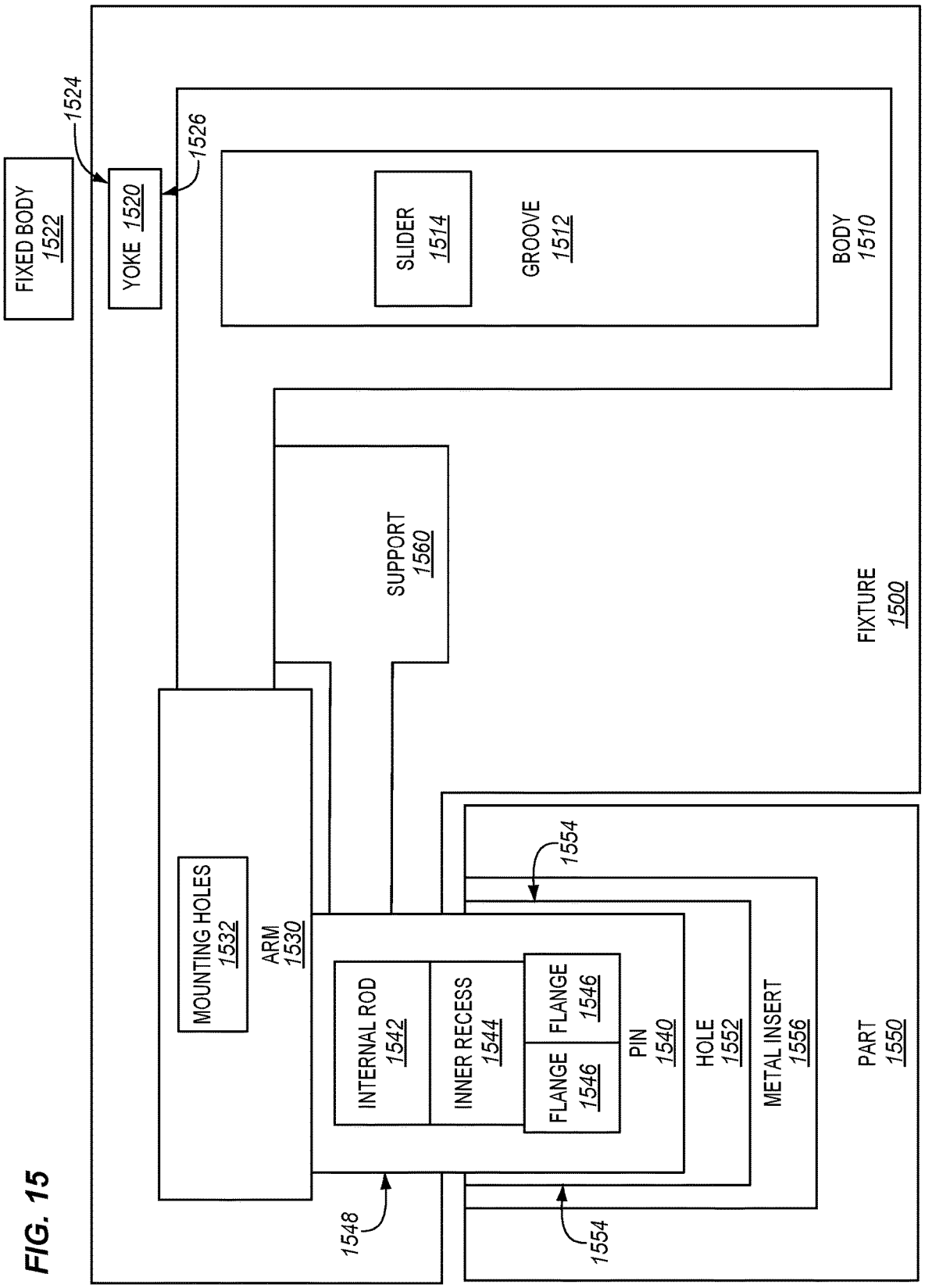
FIG. 15 is a block diagram of a fixation system in an illustrative embodiment.

FIG. 15 is a block diagram of a fixture 1500 in an illustrative embodiment. According to FIG. 15, fixture 1500 includes body 1510, which defines a groove 1512 in which a slider 1514 moves. A first end 1526 of yoke 1520 is rotatably attached to slider 1514, and a second end 1524 of yoke 1520 is attached to fixed body 1522. Arm 1530 extends from body 1510, and includes mounting holes 1532 for adjusting its position. A pin 1540 extends from arm 1530, and pin 1540 includes internal rod 1542, internal recess 1544, and flanges 1546. Pin 1540 is surrounded by a sacrificial jacket 1548. Pin 1540 is inserted into hole 1552 within part 1550. Hole 1552 is defined by a metal insert 1556 having walls 1554. Pin 1540 may be expanded in diameter to form an interference fit with hole 1552, in order to support part 1550. Support 1560 provides additional support to pin 1540 in order to enhance the strength of pin 1540 in response to bending moments applied by part 1550. Metal insert 1556 is optional and does not exist in all embodiments. Furthermore, it may be possible to forego sacrificial jacket 1548 as well in some embodiments (e.g., when metal insert 1556 is used).

Figure 18:
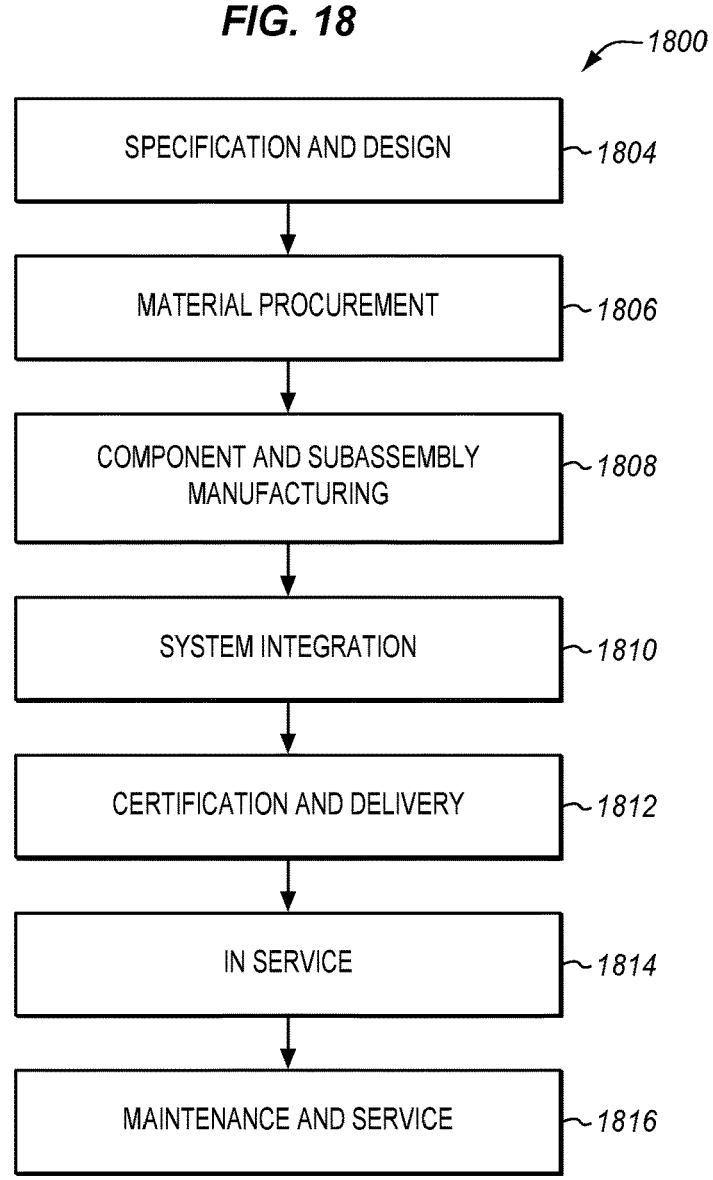
FIG. 18 is a flow diagram of aircraft production and service methodology in an illustrative embodiment.
Figure 19:
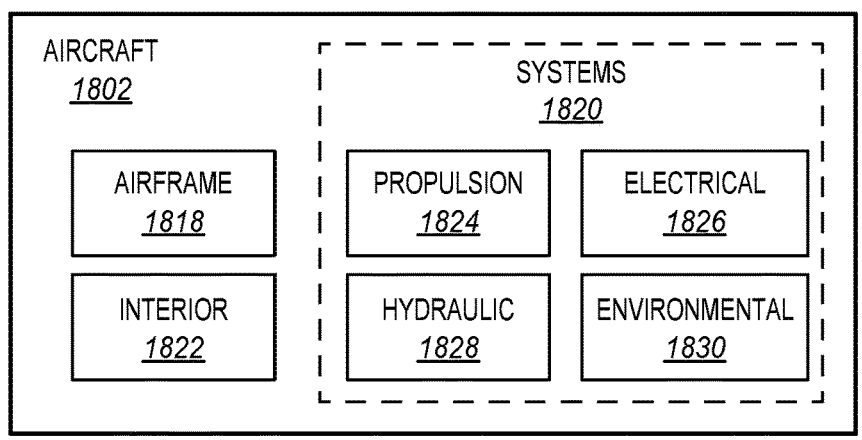
FIG. 19 is a block diagram of an aircraft in an illustrative embodiment.

Referring more particularly to the drawings, embodiments of the disclosure may be described in the context of aircraft manufacturing and service in method 1800 as shown in FIG. 18 and an aircraft 1802 as shown in FIG. 19. During pre-production, method 1800 may include specification and design 1804 of the aircraft 1802 and material procurement 1806. During production, component and subassembly manufacturing 1808 and system integration 1810 of the aircraft 1802 takes place. Thereafter, the aircraft 1802 may go through certification and delivery 1812 in order to be placed in service 1814. While in service by a customer, the aircraft 1802 is scheduled for routine work in maintenance and service 1816 (which may also include modification, reconfiguration, refurbishment, and so on). Apparatus and methods embodied herein may be employed during any one or more suitable stages of the production and service described in method 1800 (e.g., specification and design 1804, material procurement 1806, component and subassembly manufacturing 1808, system integration 1810, certification and delivery 1812, service 1814, maintenance and service 1816) and/or any suitable component of aircraft 1802 (e.g., airframe 1818, systems 1820, interior 1822, propulsion system 1824, electrical system 1826, hydraulic system 1828, environmental 1830).

Each of the processes of method 1800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 1802 produced by method 1800 may include an airframe 1818 with a plurality of systems 1820 and an interior 1822. Examples of systems 1820 include one or more of a propulsion system 1824, an electrical system 1826, a hydraulic system 1828, and an environmental system 1830. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1800. For example, components or subassemblies corresponding to component and subassembly manufacturing 1808 may be fabricated or manufactured in a manner similar to components or subassemblies produced while the aircraft 1802 is in service. Also, one or more apparatus embodiments, method embodiments, or a combination thereof may be utilized during the subassembly manufacturing 1808 and system integration 1810, for example, by substantially expediting assembly of or reducing the cost of an aircraft 1802. Similarly, one or more of apparatus embodiments, method embodiments, or a combination thereof may be utilized while the aircraft 1802 is in service, for example and without limitation during the maintenance and service 1816. For example, the techniques and systems described herein may be used for material procurement 1806, component and subassembly manufacturing 1808, system integration 1810, service 1814, and/or maintenance and service 1816, and/or may be used for airframe 1818 and/or interior 1822. These techniques and systems may even be utilized for systems 1820, including, for example, propulsion system 1824, electrical system 1826, hydraulic 1828, and/or environmental system 1830.

In one embodiment, a part comprises a portion of airframe 1818, and is manufactured during component and subassembly manufacturing 1808. The part may then be assembled into an aircraft in system integration 1810, and then be utilized in service 1814 until wear renders the part unusable. Then, in maintenance and service 1816, the part may be discarded and replaced with a newly manufactured part. Inventive components and methods may be utilized throughout component and subassembly manufacturing 1808 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for securing a part during fabrication, the part having a weight, the method comprising:
    forming multiple interference fits between each of multiple pins and respective multiple undersized holes disposed at a surface of the part, wherein the multiple undersized holes are disposed such that centerlines of the holes intersect a neutral axis of the part;
    supporting at least a portion of the weight of the part with the multiple interference fits;
    adjusting a pulley system to compensate for differences in elevation between the multiple interference fits;
    removing the pins; and
    after removing the pins, drilling out the multiple undersized holes to a respective assembly diameter, wherein the assembly diameter is larger than a diameter of the undersized hole.

2. The method of claim 1 wherein the method further comprises:
    surface treating the part while at least the portion of the weight of the part is supported by the multiple interference fits.

3. The method of claim 1 wherein:
    drilling out the multiple undersized holes includes drilling out any lip that protrudes out of one or more of the multiple undersized holes.

4. The method of claim 1 wherein:
    drilling out the multiple undersized holes includes drilling out any flange that protrudes out of one or more of the multiple undersized holes.

5. The method of claim 1 further comprising:
    surface treating the part while at least the portion of the weight of the part is supported by the multiple interference fits, wherein surface treating the part comprises painting the part.

6. The method of claim 1 further comprising:
    rotating the part while the multiple interference fits are maintained.

7. The method of claim 6 wherein:
    rotating the part is performed about a cross-section center of mass of the part.

8. The method of claim 1 wherein one or more of the multiple undersized holes is a through-hole.

9. The method of claim 1 wherein one or more of the multiple undersized holes is a blind hole.

10. A method for securing a part during fabrication, the method comprising:
    supporting the part by inserting multiple pins in respective multiple undersized holes in the part, wherein the multiple undersized holes are disposed such that centerlines of the holes intersect a neutral axis of the part;
    adjusting a pulley system to compensate for differences in elevation between the multiple pins;
    surface treating a surface of the part while the part is supported by the multiple pins;
    removing the multiple pins; and
    after removing the multiple pins, drilling out the multiple undersized holes to a respective assembly diameter, wherein the assembly diameter is larger than a diameter of the undersized hole.

11. The method of claim 10 wherein:
    drilling out the multiple undersized holes includes drilling out any lip that protrudes out of one or more of the multiple holes.

12. The method of claim 10 wherein:
    drilling out the multiple undersized holes includes drilling out any flange that protrudes out of one or more of the multiple holes.

13. The method of claim 10 wherein:
    wherein surface treating comprises painting the surface of the part.

14. The method of claim 10 further comprising:
    rotating the part while the part is supported by the multiple pins.

15. The method of claim 14 wherein:
    rotating the part is performed about a cross-section center of mass of the part.

16. The method of claim 10 wherein one or more of the multiple undersized holes is a through-hole.

17. The method of claim 10 wherein one or more of the multiple undersized holes is a blind hole.

18. A method for securing a part during fabrication, the part having a weight, the method comprising:
    forming an interference fit between each pin of a plurality of pins and a corresponding plurality of undersized holes disposed at a surface of the part, wherein the plurality of undersized holes are disposed such that centerlines of the holes intersect a neutral axis of the part;
    adjusting a pulley system to compensate for differences in elevation between the plurality of pins;
    supporting weight of the part by the interference fit;
    surface treating the surface of the part while weight of the part is supported by the interference fit;
    removing the plurality of pins; and
    after removing the pins, drilling out the plurality of undersized holes to a corresponding assembly diameter, wherein each corresponding assembly diameter is larger than a corresponding diameter of each undersized hole.

19. The method of claim 18 wherein drilling out the plurality of undersized holes includes drilling out any lip that protrudes out of one or more of the plurality of undersized holes.

20. The method of claim 18 wherein drilling out the plurality of undersized holes includes drilling out any flange that protrudes out of one or more of the plurality of undersized holes.

* * * * *